United States Patent
Wakumoto

(10) Patent No.: US 9,397,934 B2
(45) Date of Patent: *Jul. 19, 2016

(54) METHODS FOR PACKET FORWARDING THOUGH A COMMUNICATION LINK OF A DISTRIBUTED LINK AGGREGATION GROUP USING MESH TAGGING

(71) Applicant: HEWLETT PACKARD ENTERPRISE DEVELOPMENT LP, Houston, TX (US)

(72) Inventor: Shaun Wakumoto, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,859

(22) Filed: May 20, 2014

(65) Prior Publication Data

US 2014/0254377 A1    Sep. 11, 2014

Related U.S. Application Data

(63) Continuation of application No. 13/009,548, filed on Jan. 19, 2011, now Pat. No. 8,730,809.

(51) Int. Cl.
*H04L 12/721* (2013.01)
*H04L 12/709* (2013.01)
*H04L 12/761* (2013.01)

(52) U.S. Cl.
CPC .............. *H04L 45/66* (2013.01); *H04L 45/245* (2013.01); *H04L 45/566* (2013.01); *H04L 45/16* (2013.01); *Y02B 60/33* (2013.01)

(58) Field of Classification Search
USPC .......................................... 370/229, 389, 235
See application file for complete search history.

(56) References Cited

U.S. PATENT DOCUMENTS

| | | | |
|---|---|---|---|
| 6,195,349 B1 | 2/2001 | Hiscock et al. | |
| 6,556,541 B1 | 4/2003 | Bare | |
| 7,251,217 B2 | 7/2007 | Wong et al. | |
| 7,359,383 B2 | 4/2008 | Wakumoto et al. | |
| 7,376,089 B2* | 5/2008 | Wakumoto | H04L 45/02 370/254 |
| 7,526,577 B2* | 4/2009 | Pinkerton et al. | 709/249 |
| 7,551,616 B2* | 6/2009 | Devi | H04L 45/245 370/389 |
| 7,664,037 B2* | 2/2010 | Conner | H04L 12/2854 370/238 |
| 7,873,693 B1* | 1/2011 | Mehrotra et al. | 709/203 |

(Continued)

FOREIGN PATENT DOCUMENTS

JP    2002305541    10/2002

*Primary Examiner* — Brandon Renner
*Assistant Examiner* — Deepa Belur
(74) *Attorney, Agent, or Firm* — Hewlett Packard Enterprise Patent Department

(57) ABSTRACT

A method for packet forwarding through a communication link of a distributed link aggregation group (LAG) in a mesh network using a path tag is described herein. A packet is received on a non-mesh port of a first network device of the mesh network. A Media Access Controller (MAC) destination address of the packet that is associated with a plurality of network devices in the mesh is determined. Each network device of the plurality of network devices includes a link grouped in the distributed LAG. A destination mesh device from the plurality of network devices is selected. A plurality of available paths between the first network device and the destination mesh device are determined. A path of the plurality of available paths is selected. A tag associated with the selected path is inserted into the packet, and the packet is forwarded along the selected path.

14 Claims, 8 Drawing Sheets

(56) References Cited

U.S. PATENT DOCUMENTS

| | | | |
|---|---|---|---|
| 7,974,202 B2* | 7/2011 | Solomon | H04L 12/5695 370/235 |
| 8,125,928 B2* | 2/2012 | Mehta et al. | 370/254 |
| 8,767,731 B2* | 7/2014 | Balus et al. | 370/390 |
| 8,780,896 B2* | 7/2014 | Mehra | 370/359 |
| 2005/0160171 A1 | 7/2005 | Rabie et al. | |
| 2005/0163115 A1* | 7/2005 | Dontu et al. | 370/389 |
| 2005/0213582 A1* | 9/2005 | Wakumoto | H04L 12/5695 370/395.3 |
| 2005/0259647 A1* | 11/2005 | Wakumoto et al. | 370/389 |
| 2007/0214282 A1* | 9/2007 | Sen | H04L 67/1017 709/245 |
| 2008/0075117 A1* | 3/2008 | Tanaka | 370/471 |
| 2008/0279106 A1* | 11/2008 | Goodfellow et al. | 370/238 |
| 2008/0298236 A1 | 12/2008 | Ervin et al. | |
| 2010/0115272 A1* | 5/2010 | Batta | H04L 45/00 713/162 |
| 2011/0080855 A1 | 4/2011 | Fung | |
| 2011/0164503 A1* | 7/2011 | Yong | H04L 69/22 370/237 |
| 2011/0267950 A1 | 11/2011 | Solomon | |
| 2011/0286462 A1* | 11/2011 | Kompella | 370/395.53 |
| 2012/0026878 A1* | 2/2012 | Scaglione | H04L 41/0816 370/235 |
| 2012/0033665 A1* | 2/2012 | Da Silva et al. | 370/389 |
| 2012/0063312 A1* | 3/2012 | Sarwar | H04L 47/10 370/235 |
| 2012/0170575 A1* | 7/2012 | Mehra | 370/359 |
| 2012/0182872 A1* | 7/2012 | Wakumoto | H04L 45/245 370/235 |
| 2014/0177438 A1* | 6/2014 | Luo et al. | 370/230 |

* cited by examiner

Network Device 330

Layer 2 MAC Address Table 340

| MAC address | VID | Switch ID | Port |
|---|---|---|---|
| 000883-123456 | 1 | 12, 2 | 10 |
| 000883-654321 | 2 | 1 | 16 |
| ... | ... | ... | ... |
| 080009-2468ac | 1 | 4 | 20 |

Switch Table 345

| Switch ID | Tag |
|---|---|
| 1 | 2417 |
| 1 | 4532 |
| 1 | 3267 |
| 2 | 7524 |
| 2 | 2395 |
| 3 | 3469 |
| ... | ... |
| 12 | 7264 |

Egress Forwarding Table 360

| Tag | Port |
|---|---|
| 4532 | 10 |
| 2417 | 12, 13,... |
| 3267 | 11 |
| ... | ... |

*FIG. 3*

METHODS FOR PACKET FORWARDING THOUGH A COMMUNICATION LINK OF A DISTRIBUTED LINK AGGREGATION GROUP USING MESH TAGGING

I. BACKGROUND

Link aggregation or trunking enables the connection of two networked devices, such as network devices, computers, end stations, etc., by grouping multiple physical network links between the devices into a single logical link. For example, administrators of a network aggregate several Ethernet links together into a link aggregation group (LAG) or trunk as defined in the IEEE 802.1ax standard. By setting up a LAG based on these standards, the network appears to run on a single Media Access Controller (MAC) that distributes the Ethernet packets among the physical links in the LAG.

Link aggregation provides for greater redundancy, such that if one of the physical network links fails, another physical network link of the same logical link may be used. Additionally, grouping multiple physical network links may increase the bandwidth capacity of the communication channel between the two devices and provides load balancing over the physical links that are grouped together.

II. BRIEF DESCRIPTION OF THE DRAWINGS

The present disclosure may be better understood and its numerous features and advantages made apparent to those skilled in the art by referencing the accompanying drawings.

FIG. 3 is a simplified high-level block diagram of a network device in a mesh network including tables used selection of a destination mesh device and a path in accordance with an embodiment.

III. DETAILED DESCRIPTION

Figure 1:
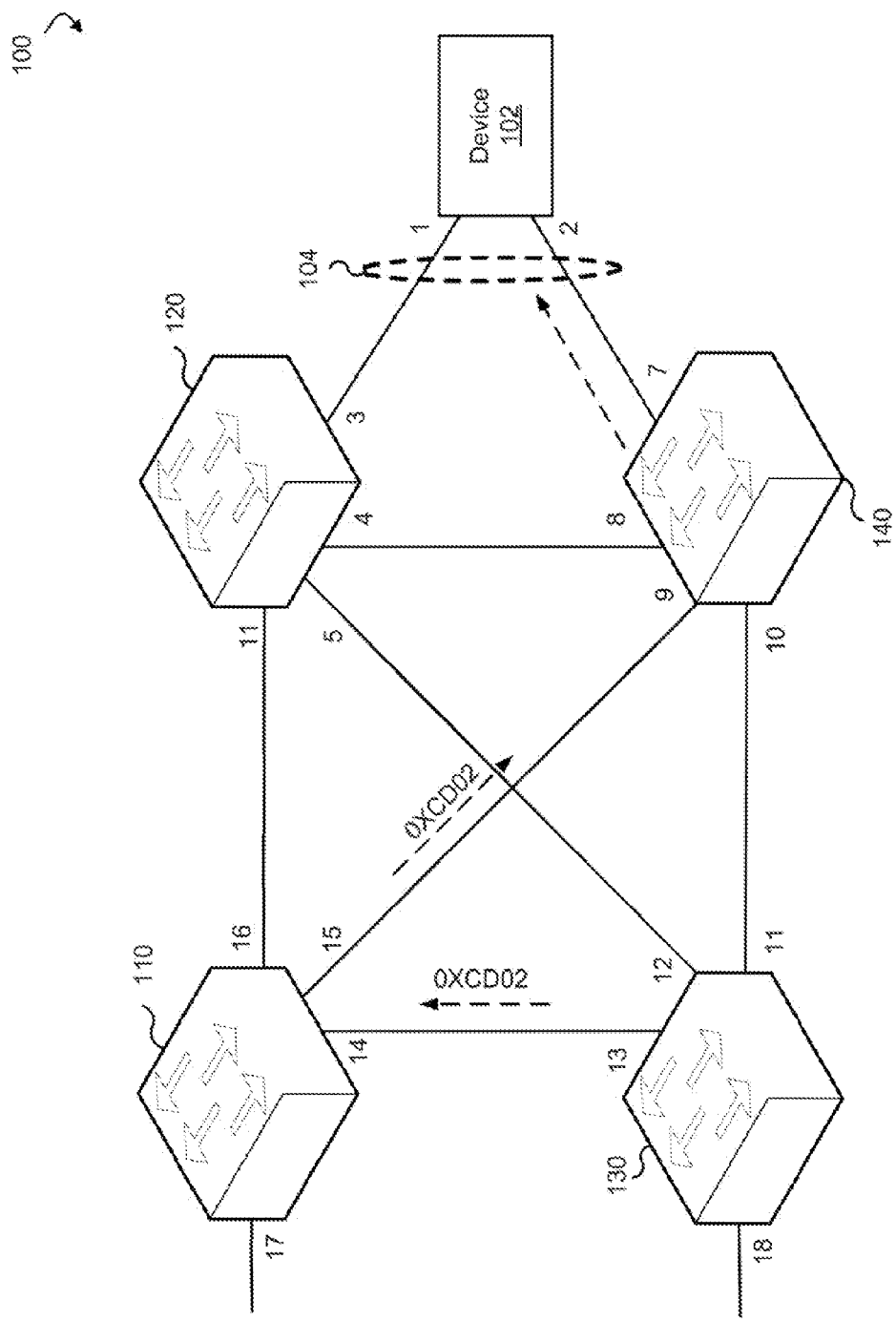
FIG. 1 is topological block diagram of a mesh network in accordance with an embodiment.

Network devices and protocols associated therewith may be used to manage redundant paths between network devices. Where there is but a single path connecting two network devices, that single path, including all intermediate devices between the source and destination devices, represent a single point of failure in network communications between that source and destination device.

Redundant paths can be used to enhance reliability of the network. Multiple paths between two devices enhance reliability of network communication between the devices by allowing for a redundant (backup) network path to be used between two devices when a first path fails. A mesh is a network which provides use of the redundant paths even in the presence of path loops.

Link aggregation may be used to increase bandwidth for Ethernet connections by aggregating multiple physical ports to form a larger logical port. A physical port is a connection point for a network cable, such as an Ethernet cable, and two networked devices. As used herein, the term Ethernet is interpreted to be read broadly and to encompass local area networks and the protocols and standards used in local area networks.

The logical port has multiple links, referred to herein as redundant links, which are grouped into a single connection such as a link aggregation group (LAG). Aggregation of the multiple links may be implemented in software, hardware, firmware, and the like. A distributed LAG comprises of at least three devices. A first and a second device have one or more links to a third devices. These links are grouped together to form a single logical link or LAG. The third device sees all of these links as a single logical link, and sees the first and second device as the same logical device. The first and second devices communicate to one another and participate in the LAG together, thus removing the single point of network failure for the third device. In addition to the first and second devices, there may be additional devices participating in this distributed LAG.

Distributed link aggregation grouping in the context of a non-mesh network presents challenges. Redundant links may be disabled and traffic through the distributed LAG may be funneled through a single switch even where the LAG spans multiple switches. As such, the single switch may become a bottleneck of traffic through the distributed LAG.

In a mesh network using mesh tagging, the traffic through the distributed LAG may be load-balanced among the various switches that have links grouped in the distributed LAG. This load balancing may minimize bottlenecks and increase network performance. Mesh tagging is further described in U.S. Pat. No. 7,359,383, titled, "Load Balancing with Mesh Tagging," filed Mar. 29, 2004 which is incorporated by reference herein for all purposes.

A method for packet forwarding through a communication link of a distributed link aggregation group (LAG) in a mesh network using a path tag is described herein. A packet is received on a non-mesh port of a first network device of the mesh network. A Media Access Controller (MAC) destination address of the packet that is associated with a plurality of network devices in the mesh is determined. Each network device of the plurality of network devices includes a link grouped in the distributed LAG. A destination mesh device from the plurality of network devices is selected. A plurality of available paths between the first network device and the destination mesh device are determined. A path of the plurality of available paths is selected. A tag associated with the selected path is inserted into the packet, and the packet is forwarded along the selected path.

As used herein, a source mesh device is a network device, such as a switch or router, which is a point of entry of a packet into a particular mesh network. A destination mesh device is a network device within the mesh network which is an exit point of a packet out of a particular mesh network. As used herein, an intermediate network device is a network device within the mesh network and which is not a source mesh device or a destination mesh device.

Each network device in the mesh network has a plurality of available paths to each of the other network devices. For example, a data packet may travel along any one of the available paths from a source mesh device to a destination mesh device.

In a mesh network, egress packet forwarding may be accomplished using mesh tagging. Typically for unicast traffic, tags are used to identify paths within the mesh from a source to a destination mesh device. The tags may then be used as an index to determine the egress port of the mesh device, for example, using an egress forwarding table.

FIG. 1 is topological block diagram of a mesh network 100 in accordance with an embodiment. Mesh network 100 includes network device 110, network device 120, network device 130, and network device 140. As shown, mesh network 100 is employed as a full mesh topology where each one of network devices 110-140 is connected directly to each other. In another embodiment, mesh network 100 is implemented in a partial mesh arrangement.

Device 102 is operatively coupled to network device 120 via non-mesh port 3 of network device 120 and to network device 140 via non-mesh port 7 of network device 140. Device 102 may be a server, client device, or other computer. As used herein, an edge device is a network switch, router, or other network device on the edge of a network. Device 102 is shown as being connected directly to an edge port of edge devices (i.e., network devices 120 and 140). The connection between device 102 and network device 120, and the connection between device 102 and network device 140 may include multiple network segments, transmission technologies and components.

Network devices 110-140 are configured to analyze and filter packets. Network devices 110-140 are further configured to insert, remove, and analyze tags within the packets, select a path to a destination mesh device, and assign a tag corresponding to the selected path. Furthermore, network devices 110-140 are edge devices and are also configured to determine that a destination address of a packet is associated with network devices with links grouped in a distributed single connection such as a distributed link aggregation group (LAG), select a network device of the multiple network devices as a destination mesh device, and select a path to the destination mesh device.

In operation, when a packet with a known unicast destination is received by a non-mesh port of a network device in mesh network 100, the network device analyzes the received packet, determines the destination address of the packet, determines that the communication link from mesh network 100 to the destination address is through a distributed LAG, and identifies multiple network devices that have links grouped in the distributed LAG. One of the multiple network devices are selected as the destination mesh device, for example using a first load balancing function.

Each source/destination pair of network devices may be configured with multiple different paths. Each path may be associated with a unique path identifier. A path to the destination mesh device is selected, for example using a second load balancing function. The first load balancing function and the second load balancing function may be one in the same or may be different. A tag corresponding to the selected path is assigned for the packet. The network device then inserts the tag into the packet and forwards the packet along the selected path. As used herein, a non-mesh port is a port that does not connect to another network device in the mesh. For example, ports 3, 7, 17 and 18 are all non-mesh ports. It should be mentioned that packets that are forwarded out a mesh port go out with a path tag, whereas packets sent out a non-mesh port have this tag stripped.

Device 102 is operatively coupled to network device 120 and network device 140 via a single logical communication channel 104. In particular, port 1 of device 102 is operatively coupled to non-mesh port 3 of network device 120, and port 2 of device 102 is operatively coupled to non-mesh port 7 of network device 140. The communication link from non-mesh port 3 of network device 120 to device 120 and the communication link from non-mesh port 7 of network device 140 are aggregated in the single logical communication channel 104. As such, communication channel 184 is a distributed LAG.

In one example, a packet may enter mesh network 100 at network device 130, making network device 130 the source mesh device. Based on the packet headers, network device 130 determines the destination MAC address of the packet to be that of device 102. Typically, a destination mesh device is determined and a path to the destination mesh device from the source mesh device is selected. The destination mesh device is generally a network device in the mesh that includes a non-mesh port that provides the communication link to the destination device.

In this example, the source mesh device (i.e., network device 130) identifies two network devices (i.e., network device 120 and network device 140), both of which include physical ports that provide the communication link from mesh network 100 to device 102 through logical communication channel 104. One of these network devices is selected as the destination mesh device, for example, using a first load balancing function.

Once the destination mesh device is selected, a path from the source mesh device to the destination mesh device is selected, for example using a second load balancing function. The first and second load balancing functions may be one in the same or may be different.

If the destination mesh device is network device 140, the source mesh device (i.e., network device 130) has five paths available. A first path (0XCD02) may go from network device 130 to network device 140 via intermediate network device 110 by exiting port 13 of network device 130, entering port 14 of network device 110, exiting port 15 of network device 110, and entering port 9 of network device 140. A second path may go from network device 130 to network device 140 via intermediate network devices 110 and 120 by exiting port 13 of network device 130, entering port 14 of network device 110, exiting port 16 of network device 110, entering port 11 of network device 120, exiting port 4 of network device 120, and entering port 8 of network device 140.

A third path may go from network device 130 to network device 140 via intermediate network device 120 by exiting port 12 of network device 130, entering port 5 of network device 120, exiting port 4 of network device 120, and entering port 8 of network device 140.

A fourth path may go from network device 130 to network device 140 via intermediate network devices 120 and then 110 by exiting port 12 of network device 130, entering port 5 of network device 120, exiting port 11 of network device 120, entering port 16 of network device 110, exiting port 15 of network device 110, and entering port 9 of network device 140. A fifth path may go directly from network device 130 to network device 140 by exiting port 11 of network device 130, and entering port 10 of network device 140.

Once the path is selected, a path tag corresponding to the selected path is assigned and inserted in the packet. The packet is then transmitted along the selected path. Intermediate network devices along the path refer to the path tag to forward the packet to the next hop.

Any of these paths allow packets from non-mesh port 18 of network device 130 to be transmitted to network device 140.

As previously mentioned, the paths are from the source mesh device to a destination mesh device. When the packet arrives at the destination mesh device, any aggregated ports are seen as a single logical port to the network device. The destination mesh device determines that the packet is destined within the mesh for itself for example by analyzing the path tag, removes the path tag from the packet, and performs a lookup of the destination MAC address to determine an egress forwarding port. The packet is then forwarded out of the mesh through the egress forwarding port.

For example, when a destination mesh device, such as network device 140 receives the packet, it may remove the path tag, and perform a lookup using the destination MAC address of device 102, which may map to the egress forwarding port 7 of network device 140. The packet is sent to the destination, i.e., device 102, via port 7 of network device 140.

Mesh network 100 may include other types of networks that can support data communications using any of a variety of commercially-available protocols, including without limitation TCP/IP, SNA, IPX, AppleTalk, and the like. Merely by way of example, mesh network 100 can be a local area network (LAN), such as an Ethernet network, a Token-Ring network and/or the like; a wide-area network; a logical network, including without limitation a logical private network (VPN); the Internet; an intranet; an extranet; a public switched telephone network (PSTN): an infra-red network; a wireless network (e.g., a network operating under any of the IEEE 802.11 suite of protocols, the Bluetooth protocol known in the art, and/or any other wireless protocol); and/or any combination of these and/or other networks.

Figure 2A:
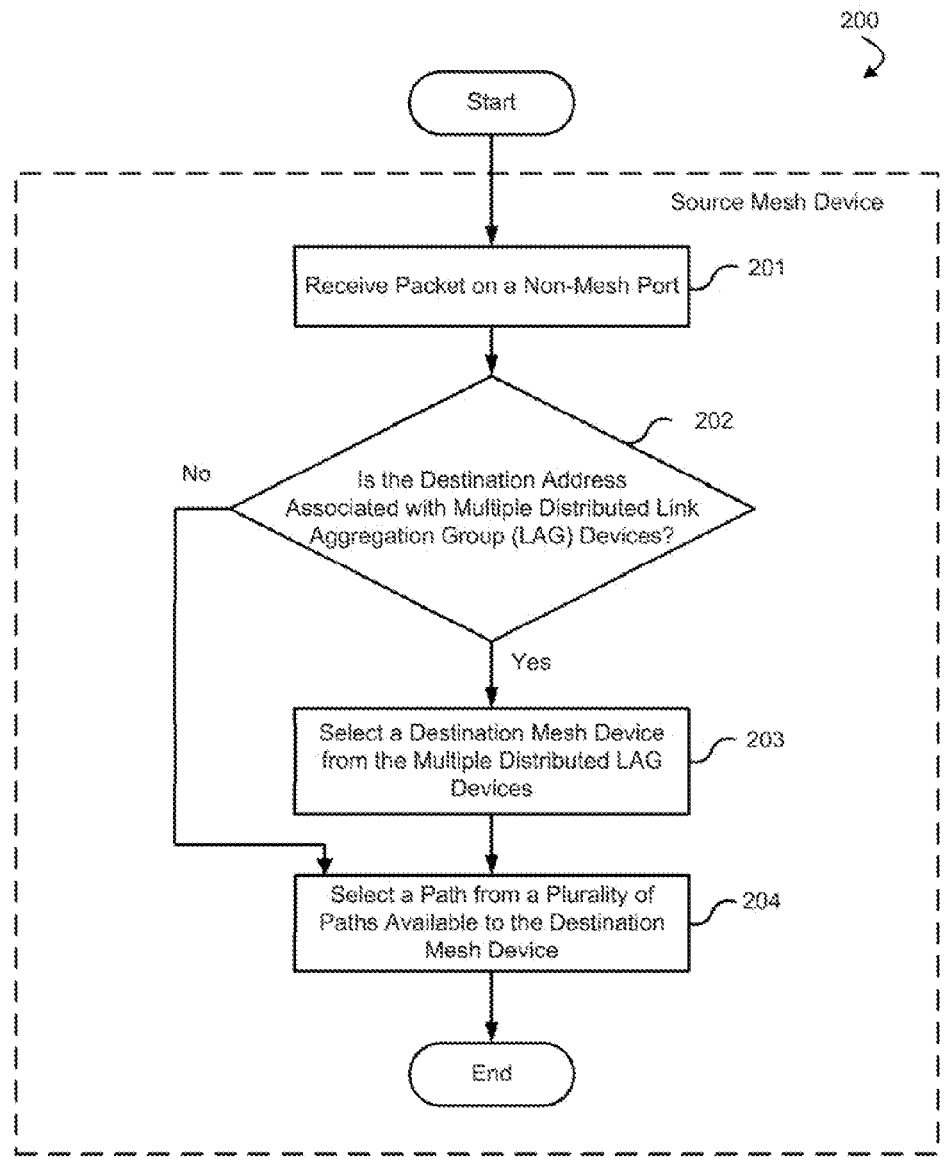
FIG. 2A is a process flow diagram for distributed link aggregation grouping using mesh tags at a source mesh device in accordance with an embodiment.

FIG. 2A is a process flow diagram for distributed link aggregation grouping using mesh tags at a source mesh device in accordance with an embodiment. The depicted process flow 200 may be carried out by execution of sequences of executable instructions. In another embodiment, the process flow 200 is carried out by components of a network device such as an egress forwarding module, an arrangement of hardware logic, e.g., an Application-Specific Integrated Circuit (ASIC), etc. For example, steps of process flow 200 may be performed by a multiport controller ASIC of a source mesh device.

A mesh network may include multiple network devices, including a source mesh device and a destination mesh device. Intermediate network devices may also be present. A plurality of Ethernet links and ports are aggregated into a distributed LAG, forming a single logical communication channel.

The membership of links and ports grouped in the distributed LAG may be maintained on the network device or by a network management server. During initialization of the mesh network, a mapping between the MAC address of the destination device and the associated destination mesh devices is provided and maintained by the network devices. Changes to the LAG membership after initialization may be propagated to the network devices in the mesh, for example by the network administrator, network management server, etc. As such, the mapping of the destination MAC address and the destination mesh devices reflects the current LAG memberships. The association of multiple destination mesh devices indicates that a distributed LAG is present.

At step 201, a packet is received on a non-mesh port, for example at a source mesh device. At step 202, it is determined whether a destination address of the packet is associated with multiple distributed LAG devices. As used herein, a distributed LAG device is a network device in the mesh that has links which are grouped in a distributed LAG.

In one example, a switch control looks up the MAC address of the destination device, which is found in the packet itself. This MAC address may map to a network device identifier(s). Each network device in the mesh is assigned a unique identifier within the mesh. The network device identifier indicates the destination mesh device in the mesh, and is associated with the MAC address of the destination device. If more than one network device identifier is mapped to the destination MAC address, it may be determined that the network devices corresponding to the identifier includes links that are grouped in a distributed LAG and processing continues to step 203. Where the destination address is not associated with multiple distributed LAG devices, processing continues to step 204.

At step 203, a destination mesh device is selected from the multiple distributed LAG devices. In one example, the source network device is configured with a plurality of load balancing operations (e.g., hash functions), one of which is set for use for selecting a destination device. The load balancing operation may use contents within the packet (e.g., source/destination MAC address, ether type, source/destination IP address, IP protocol, etc.), port utilization data, etc.

The benefit of load balancing upon entry within the mesh is that it provides more paths and better load balancing than load balancing between two ports.

At step 204, a path to the destination mesh device is selected from a plurality of available paths. As previously mentioned, mesh networks include multiple redundant paths between two devices. One path is selected, for example, using a load balancing operation, which may be one in the same or different from that used at step 203. A path tag associated with the selected path is added to the packet, and the packet is forwarded thru the mesh via an egress port associated with that tag.

Figure 2B:
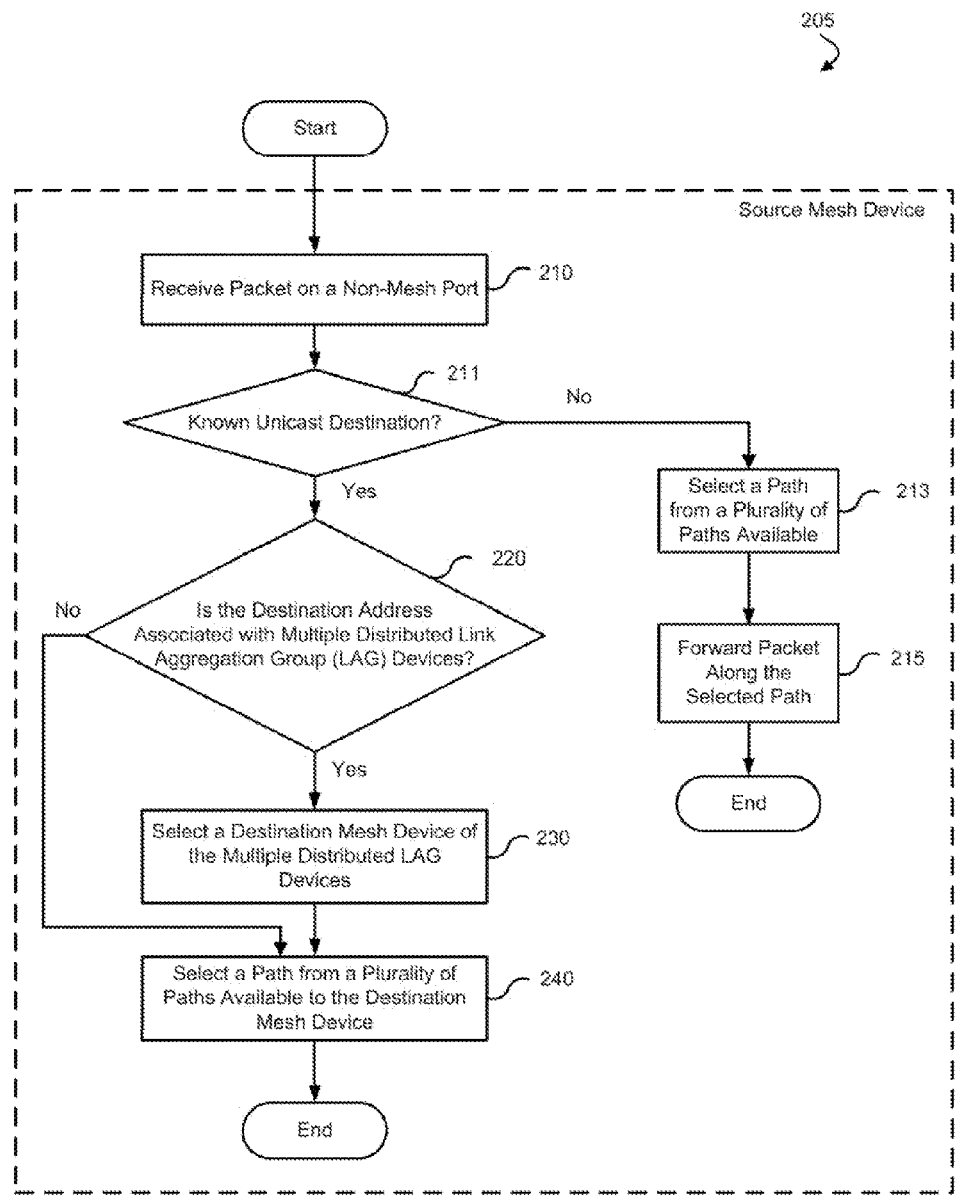
FIG. 2B is another process flow diagram for distributed link aggregation grouping using mesh tags at a source mesh device in accordance with an embodiment.

FIG. 2B is another process flow diagram for distributed ink aggregation grouping using mesh tags at a source mesh device in accordance with an embodiment. The depicted process flow 205 may be carried out by execution of sequences of executable instructions. In another embodiment, the process flow 205 is carried out by components of a network device such as an egress forwarding module, an arrangement of hardware logic, e.g., an Application-Specific Integrated Circuit (ASIC), etc. For example, steps of process flow 205 may be performed by a multiport controller ASIC of a source mesh device.

In one example, a mesh network may include multiple network devices, including a source mesh device and a destination mesh device. Intermediate network devices may also be present. A plurality of Ethernet links and ports may be aggregated into a distributed LAG, forming a single logical communication channel.

At step 210, a packet is received on a non-mesh port, for example at a source mesh device. At step 211, it is determined whether the packet has a known unicast destination address. If not, it may be determined that the packet has a broadcast destination address, a multicast destination address, or an unknown unicast destination address, and processing continues to step 213 where a broadcast or multicast path from a plurality of available broadcast or multicast paths is selected. A path tag associated with the selected path is added to the packet, and the packet is forwarded thru the mesh along the selected path at step 215. The packet may be forwarded via an egress port(s) associated with that tag. There may be many egress ports associated with a broadcast path.

If the packet has a known unicast destination address, at step 220, it is determined whether the destination address is associated with multiple distributed LAG devices. In one example, a switch control may look-up the MAC address of the destination device, which is found in the packet itself. This MAC address may map to a network device identifier(s). If more than one network device identifier is mapped to the destination MAC address, it may be determined that the network devices corresponding to the identifier includes links that are grouped in a distributed LAG, and processing continues to step 230. Where the destination address is not associated with multiple network devices with links in the distributed LAG, processing continues to step 240.

At step 230, a destination mesh device is selected from the multiple distributed LAG devices. In one embodiment, the source network device is configured with a plurality of load balancing operations (e.g., hash functions), one of which is set for use for selecting a destination device. The load balancing operation may use contents within the packet (e.g., source/destination MAC address, ether type, source/destination IP address, IP protocol, etc.), port utilization data, etc.

At step 240, a path to the destination mesh device is selected from a plurality of available paths. As previously mentioned, mesh networks include multiple redundant paths between two devices. One path is selected, for example, using a load balancing operation, which may be one in the same or different from that used at step 230. A path tag associated with the selected path is added to the packet, and the packet is forwarded thru the mesh via an egress port(s) associated with that tag.

FIG. 3 is a simplified high-level block diagram of a network device 330 in a mesh network including tables used for selection of a destination mesh device and path in accordance with an embodiment. Network device 330 includes a Layer 2 MAC address table 340, a switch table 345, and an egress forwarding table 360.

Layer 2 MAC address table 340 includes various fields such as a destination MAC address field, a VLAN identifier (VID) field, a switch identifier (switch ID) field, and a port field. One or more switch identifiers may be associated with a destination MAC address. If more than one switch identifier is mapped to the destination MAC address, it may indicate that the network devices corresponding to the identifiers include links and physical ports that are grouped in a distributed LAG. In one embodiment, the switch identifiers reflect a current view of port membership in any distributed LAG. As shown, for example, MAC address 000883-123456 is mapped to two switch identifiers, indicating a distributed LAG.

Unicast, multicast, and broadcast packets can be associated with a destination MAC address. In one embodiment, broadcast packets have a destination MAC address of FFFFFF-FFFFFF. Multicast packets have the lowest bit of the highest nibble set in the destination MAC address.

Switch table 345 includes various fields such as a switch ID field and a tag field. A tag identifies a particular path through a mesh network from a source mesh device to a destination mesh device. In one embodiment, the tag includes a source switch identifier, a destination switch identifier, and a path identifier. The path identifier is unique for each source/destination pair. Switch table 345 includes the correlation between network devices and available path(s) for each network device. For example, there are three different paths available for communication from a source mesh device to the network device having switch ID "1."

Egress forwarding table 360 contains the correlation between tags and ports. Egress forwarding table 360 includes a tag field and a port field. The port field specifies egress port(s) of network device 330. The egress port(s) may be mesh or non-mesh ports. Multiple egress ports may indicate the paths used to forward broadcast, multicast, or unknown unicast destination packets. In one embodiment, egress forwarding table 360 includes another field that specifies whether a given tag represents a path that terminates at network device 330, thereby indicating that network device 330 is a destination switch. This field would indicate to the hardware that the tags should be removed or otherwise stripped from the packet before being sent out the non-mesh egress port(s). In another embodiment, network device 330 may look at the switch identifier in the path to itself to determine if it is the destination switch.

In operation, a packet may be received at a non-mesh port of network device 330, which may be functioning as a source mesh device in a mesh network. A destination mesh device may be determined by gathering a destination MAC address from the packet. An entry in Layer 2 MAC address table 340 is located using the destination MAC address, and switch identifier(s) associated with the destination MAC address is obtained.

Where there are multiple switch identifiers associated with a single destination MAC address, a selection process is performed such that a single network device is selected among the multiple network devices. The switch identifier that corresponds to the selected network device is determined.

One or more entries in switch table 345 are located sing the selected switch identifier as an index. Using the tag field of the located entries in switch table 345, one or more tags of available paths are determined. Each entry and tag represents an available path. One path is selected, and the corresponding path tag is inserted into the packet. The path tag is used to index an egress forwarding table to forward the packet out the correct egress port(s).

In operation, a packet may be received at a mesh port of network device 330, which may be functioning as an intermediate and/or destination mesh device. A tag is determined by examining the packet. The tag is used to index egress forwarding table 360 and correlating egress port(s) are determined. The packet may be forwarded out of the egress port(s).

Figure 4A:
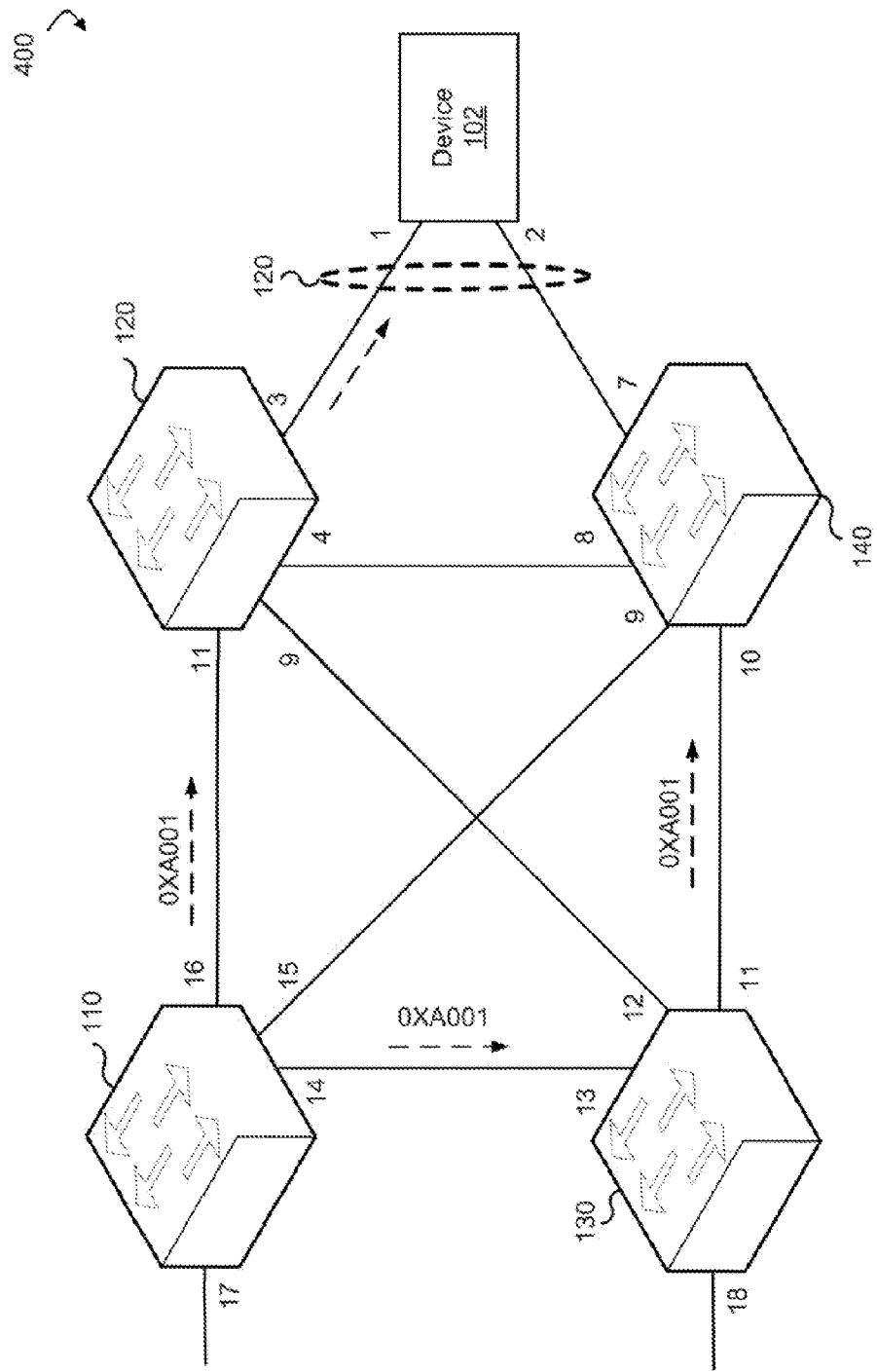
FIG. 4A is a topological block diagram of a network system and a broadcast path in accordance with an embodiment.

FIG. 4A is a topological block diagram of a network system 400 and a broadcast path in accordance with an embodiment. Mesh network 400 is structurally similar to mesh network 100.

In operation, when a packet is received by a non-mesh port of a switch in mesh network 400, the switch analyzes the received packet and determines the destination address of the packet. If the packet has a broadcast destination address, a multicast destination address, or an unknown unicast destination address, a broadcast or multicast path from a plurality of available broadcast or multicast paths is selected. A path tag associated with the selected path is added to the packet, and the packet is forwarded thru the mesh along the selected path.

For example, a packet may enter non-mesh port 17 of switch 110. Switch 110 may extract a destination MAC address from the header of the packet. The destination MAC address is determined to be a broadcast packet. Various broadcast paths may be available. A first broadcast path (0XA001) may go from switch 110 to switch 120 and switch 130, and from switch 130 to switch 140.

Unlike unicast packets which take a single path to the destination switch, packets with a broadcast, multicast, or unknown unicast destination addresses travel to all switches in the mesh such that each network device in the mesh can forward the packet out all non-mesh ports. However, it is undesirable to send a packet on multiple physical links of a LAG.

For example, both switch 120 and switch 140 receive the packet along broadcast path OXA001, and both normally forward the packet out of their non-mesh egress ports, i.e., port 3 on switch 120 and port 7 on switch 140. As such, device 102 may receive the same broadcast packet twice.

In one embodiment, each network device that has ports/links that are members of the distributed LAG (hereinafter, "distributed LAG device") may determine whether it should forward the packet via its own non-mesh egress port, or otherwise allow another distributed LAG device to deliver the packet. This determination may be made by each distributed LAG device by running certain portions of the packet through, for example, a load balancing function (e.g., hash function). The load balancing function may have been previously agreed upon among the distributed LAG devices. By executing the same load balancing function, all of the distributed LAG devices arrive at the same result thereby ensuring that only one distributed LAG device forwards the packet via its egress non-mesh port.

Continuing the example described above, switch 120 and switch 140 are both distributed LAG devices, and as such, both execute the same load balancing function. Both switches 120 and 140 arrive at the same result, i.e., that switch 120 is to forward the packet to device 102. As such, switch 120 removes the broadcast path tag and forwards the packet to device 102 via non-mesh egress port 3, which arrives on port 1 of device 102.

In one embodiment, a load balancing function may be applied once. In the case of a broadcast, multicast, or unknown unicast destination packet, the source mesh device may apply a load balancing operation once, which chooses both the path that the packet takes to reach all of the network devices in the mesh, and decides which distributed LAG device forwards that packet out to the destination.

For example, multiple broadcast paths may be available, and each path has a unique path tag. By using a load balancing function, a path is selected for the broadcast packet to reach every network device in the mesh. An egress forwarding table in each of the network devices in the mesh may have been set to specify an egress port or ports for each path tag. In the case of multiple distributed LAG devices, for each distributed LAG, only one member port may be activated. For example, the egress forwarding tables of all of the distributed LAG devices may correlate only one of the member ports with a particular path tag. As such, by applying the load balancing function once to select the path, it is also determined which distributed LAG device forwards the packet towards the destination.

Figure 4B:
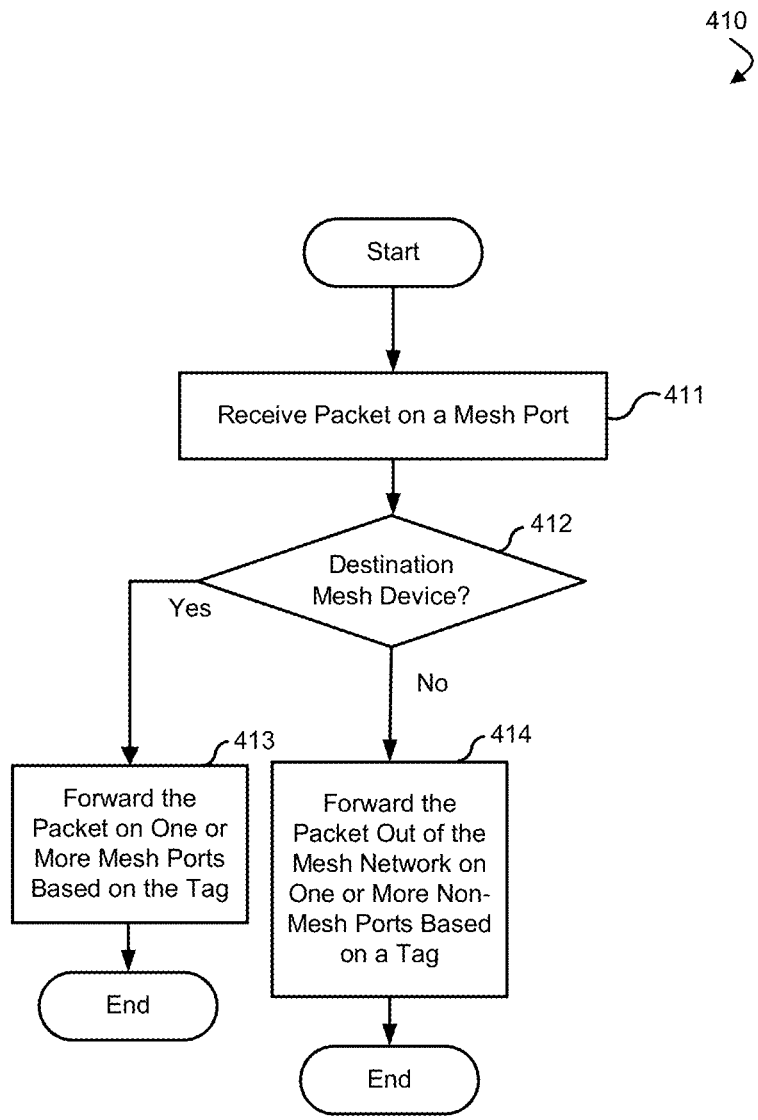
FIG. 4B is a process flow diagram for distributed link aggregation grouping using mesh tags in accordance with an embodiment.

FIG. 4B is a process flow diagram for distributed link aggregation grouping using mesh tags in accordance with an embodiment. The depicted process flow 410 may be carried out by execution of one or more sequences of executable instructions. In another embodiment, the process flow 410 is carried out by components of a network device such as an egress forwarding module, an arrangement of hardware logic, e.g., an Application-Specific Integrated Circuit (ASIC), etc. For example, one or more steps of process flow 410 may be performed by a multiport controller ASIC of an intermediate network device and/or destination mesh device.

In one embodiment, a mesh network may include multiple network devices, including a source mesh device and a destination mesh device. Intermediate network devices may also be present. A plurality of Ethernet links may be aggregated into a distributed LAG, forming a single logical communication channel. At step 411, a packet is received on a mesh port, for example at a network device.

At step 412, it is determined whether the network device that received the packet (at step 411) is a destination mesh device. The outcome of this decision block determines whether the packet is an intermediate network device or a destination mesh device. Different forwarding mechanisms are employed for both. Various known methods of making this determination may be performed, such as using the information in the packet. For example, the path tag includes identifiers of both the source mesh device and the destination mesh device. As such, a receiving network device is able to determine if it is the destination mesh device by examining the tag, which is a part of the packet.

Where it is determined that the receiving network device is the destination mesh device for the packet, at step 414, the packet may be forwarded out of the mesh network on one or more non-mesh ports of the destination mesh device based on a tag. For example, the tag in the packet may be removed and used to index an egress forwarding table in the destination mesh device. The egress forwarding table contains the correlation between tags and egress ports of the destination mesh device. The packet may be forwarded out of the egress port(s) corresponding to the tag.

It may be determined that the receiving network device is not the destination mesh device. As such, the receiving network device is an intermediate network device that is within the selected path of the packet. At step 413, the packet may be forwarded along the path on one or more mesh ports of the intermediate network device based on the tag. Unicast paths typically have a single mesh port that they can exit on an intermediate network device. In one example, the tag in the packet may be used to index an egress forwarding table in the intermediate network device. The packet may be forwarded out of the egress mesh port corresponding to the tag.

Figure 4C:
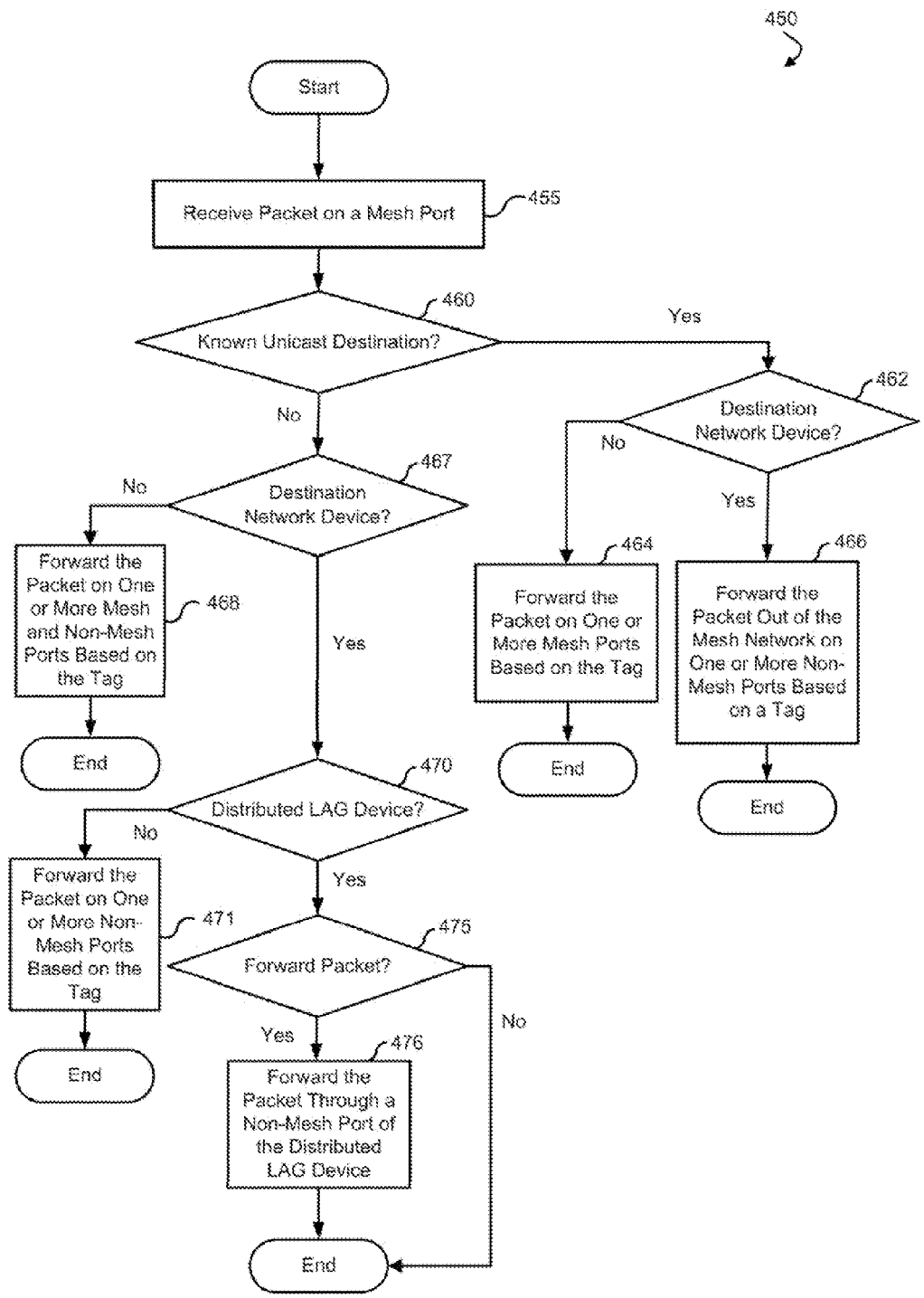
FIG. 4C is another process flow diagram for distributed link aggregation grouping using mesh tags in accordance with an embodiment.

FIG. 4C is another process flow diagram for distributed link aggregation grouping using mesh tags in accordance with an embodiment. The depicted process flow 450 may be carried out by execution of one or more sequences of executable instructions. In another embodiment, the process flow 450 is carried out by components of a network device such as an egress forwarding module, an arrangement of hardware logic, e.g., an Application-Specific Integrated Circuit (ASIC), etc. For example, one or more steps of process flow 450 may be performed by a multiport controller ASIC of an intermediate network device and/or destination mesh device.

In one embodiment, a mesh network may include multiple network devices, including a source mesh device and a destination mesh device. Intermediate network devices may also be present. A plurality of Ethernet links and physical port may be aggregated into a distributed LAG, forming a single logical communication channel. At step 455, a packet is received on a mesh port, for example at a network device.

At step 460, it is determined whether the packet has a known unicast destination address. Where the packet is a known unicast destination packet, processing continues to step 462. At this step, it is determined whether the network device that received the packet (at step 455) is a destination mesh device. The outcome of this decision block determines whether the packet is an intermediate network device or a destination mesh device.

Where it is determined that the receiving network device is the destination mesh device for the packet, at step 466, the packet may be forwarded out of the mesh network on one or more non-mesh ports of the destination mesh device based on a tag.

It may be determined that the receiving network device is not the destination mesh device for the packet. As such, the receiving network device is an intermediate network device that is within the selected path of the packet. At step 464, the packet may be forwarded along the path on one or more mesh ports of the intermediate network device based on the tag. The packet may be forwarded out of the egress mesh port corresponding to the tag.

At step 460, it may be determined that the path followed by the packet is not a known unicast path. As such, the path type is broadcast, multicast, or unknown unicast destination.

At step 467, it is determined whether the network device that received the packet (at step 455) is a destination mesh device. If not, it is determined that the receiving device is an intermediate network device, and the packet is forwarded on one or more mesh and non-mesh ports based on the tag, at step 468.

If the device that received the packet at step 455 is determined to be a destination mesh device, at step 470, it is determined whether that device is a distributed LAG device. If not, processing continues to step 471, where the packet is forwarded on one or more non-mesh ports based an the tag.

Where it is determined to be a distributed LAG device, at step 475, it is determined whether to forward the packet through a non-mesh port of the distributed LAG device. As previously described, this determination may be made for example by executing a same function (e.g., hash) across all distributed LAG devices. The function selects one of the distributed LAG devices to forward the packet through the non-mesh LAG-member port. The non-mesh port may be a member of the distributed LAG.

At step 476, if selected by the function, the packet is forwarded through a non-mesh port of the distributed LAG device. If not selected, the distributed LAG device does not forward the packet. Instead, another distributed LAG device is relied upon to forward the same packet.

Figure 5:
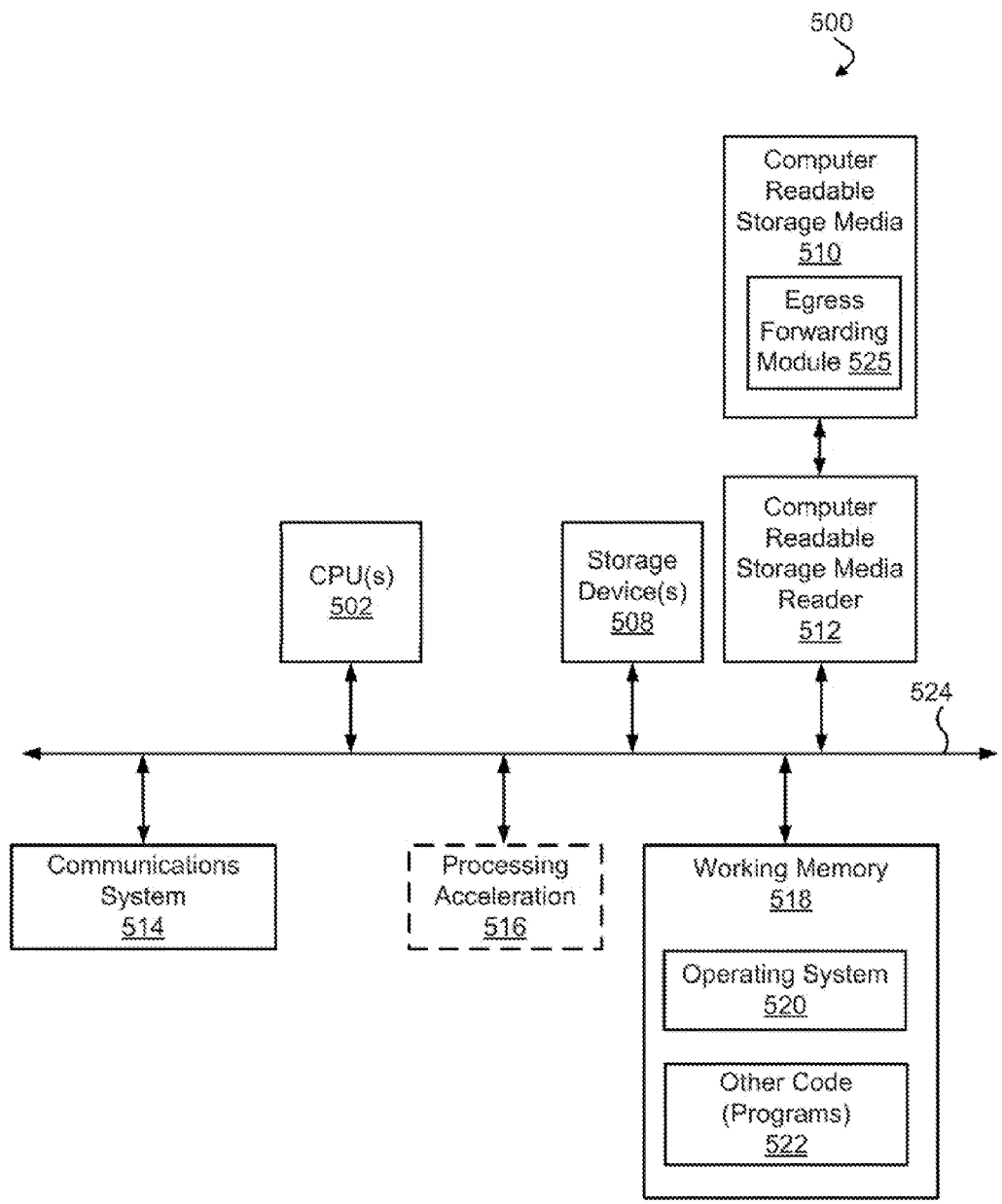
FIG. 5 illustrates a computer system in which an embodiment may be implemented.

FIG. 5 illustrates a computer system in which an embodiment may be implemented. The system 500 may be used to implement any of the computer systems described above. The computer system 500 is shown comprising hardware elements that may be electrically coupled via a bus 524. The hardware elements may include one or more central processing units (CPUs) 502. The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor (DSP), a special-purpose processor, and/or the like.

The computer-readable storage media reader 512 can further be connected to a computer-readable storage medium 510, together (and in combination with storage device(s) 508 in one embodiment) comprehensively representing remote, local, fixed, and/or removable storage devices plus any tangible non-transitory storage media, for temporarily and/or more permanently containing, storing, transmitting, and retrieving computer-readable information (e.g., instructions and data). Computer-readable storage medium 510 may be non-transitory such as hardware storage devices (e.g., RAM, ROM, EPROM (erasable programmable ROM), EEPROM (electrically erasable programmable ROM), hard drives, and flash memory). The communications system 514 may permit data to be exchanged with the network and/or any other computer described above with respect to the system 500. Computer-readable storage medium 510 includes an egress forwarding module 525.

The computer system 500 may also comprise software elements, which are machine readable instructions, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. A method for packet forwarding through a communication link of a distributed link aggregation group (LAG) in a mesh network using a path tag, the method comprising:
   receiving a packet on a first mesh port of a first network device of the mesh network, wherein another packet that is related to the packet as being part of a common broadcast or multicast having a non-mesh device as a destination is received on a second mesh port of a second network device of the mesh network, wherein the first network device has a first non-mesh port connected to the non-mesh device and the second network device has a second non-mesh port connected to the non-mesh device, and wherein the first network device, the second network device, and the non-mesh device form a LAG;
   determining, by the first network device, whether the first network device is to forward the packet to the non-mesh device; and
   performing a function across the first network device and the second network device to determine which of the first network device and the second network device is to forward the packet or the another packet to the non-mesh device, and determining whether the first network device is to forward the packet to the non-mesh device responsive to the performance of the function.

2. The method according to claim 1, wherein the packet includes a path tag that includes an identifier of the first mesh device and identifies a selected path through the mesh network to the first mesh device.

3. The method according to claim 2, further comprising:
   in response to the determination that the first network device is to forward the packet to the non-mesh device, removing the path tag from the packet and using the path tag to index an egress forwarding table in the first network device to determine the first non-mesh port of the first network device through which the packet is to be forwarded, wherein the egress forwarding table contains a correlation between the first path tag and an egress port of the first network device.

4. The method according to claim 1, wherein performing the function further comprises performing a hash function across the first network device and the second network device.

5. The method according to claim 1, wherein performing the function further comprises performing the function to balance loads between the first network device and the second network device in forwarding packets to the non-mesh device.

6. A non-transitory computer-readable medium storing a plurality of instructions to control a data processor, the plurality of instructions comprising instructions that when executed by the data processor cause the data processor to:
 receive a first packet on a first mesh port of a first network device of a mesh network, wherein a second packet that is related to the first packet as being part of a common broadcast or multicast having a non-mesh device as a destination is received on a second mesh port of the second network device of the mesh network, wherein the first network device has a first non-mesh port connected to the non-mesh device and the second network device as a second non-mesh port connected to the non-mesh device, and wherein the first network device, the second network device, and the non-mesh device form a distributed link aggregation group (LAG);
 determine whether the first network device is to forward the first packet to the non-mesh device; and
 perform a function across the first network device and the second network device to determine which of the first network device and the second network device is to forward the packet or the another packet to the non-mesh device, and determining whether the first network device is to forward the packet to the non-mesh device responsive to the performance of the function.

7. The non-transitory computer-readable medium according to claim 6, wherein the first packet includes a path tag that includes an identifier of the first mesh device and identifies a selected path through the mesh network to the first mesh device.

8. The non-transitory computer-readable medium according to claim 7, wherein the machine readable instructions are further to cause the data processor to use the path tag to index an egress forwarding table in the first network device to determine the first non-mesh port of the first network device through which the packet is to be forwarded, wherein the egress forwarding table contains a correlation between the path tag and egress ports of the first network device.

9. A network device for use in a mesh network, said network device comprising:
 a processor; and
 a memory on which is stored machine readable instructions that are to cause the processor to:
  receive a packet on a non-mesh port of a first network device of the mesh network;
  determine that a Media Access Controller (MAC) destination address of the packet is associated with a plurality of mesh devices in the mesh network, wherein each network device of the plurality of mesh devices includes a link grouped in a distributed link aggregation group (LAG);
  select a destination mesh device from the plurality of mesh devices;
  determine a plurality of available physical paths between the network device and the destination mesh device;
  select a physical path of the plurality of available physical paths;
  insert a tag associated with the selected physical path into the packet; and
  forward the packet along the selected physical path.

10. The network device according to claim 9, wherein the destination address of the packet is not a known unicast destination address, and wherein the machine readable instructions are further to cause the processor to:
 determine a plurality of available physical broadcast paths between the network device and the destination mesh device;
 select a physical path of the plurality of available physical broadcast paths;
 insert a tag associated with the selected physical broadcast path into the packet; and
 forward the packet along the selected physical broadcast path or multicast path.

11. The network device according to claim 9, wherein the machine readable instructions are further to cause the processor to:
 determine the destination address of the packet is a multicast destination address;
 determine a plurality of available physical multicast paths between the first network device and the destination mesh device;
 select a physical path of the plurality of available physical multicast paths;
 insert a tag associated with the selected physical multicast path into the packet; and
 forward the packet along the selected physical broadcast path or multicast path.

12. The network device according to claim 9, wherein to select the destination mesh device front the plurality of mesh devices, the machine readable instructions are further to cause the processor to:
 apply a first load balancing function using contents of a header of the packet; and
 select a mesh device of the plurality of mesh devices as the destination mesh device based on a result of the first load balancing function.

13. The network device according to claim 9, wherein to select the physical path, the machine readable instructions are further to cause the processor to:
 apply a second load balancing function using contents of a header of the packet; and
 select a physical path of the plurality of the available physical paths based on a result of the second load balancing function.

14. The network device according to claim 9, wherein to determine that the MAC destination address of the packet is associated with the plurality of network devices, the machine readable instructions are further to cause the processor to:
 find an entry in a MAC address table using the MAC destination address;
 determine a plurality of switch identifiers in the MAC address table, the plurality of switch identifiers correlated with the MAC destination address; and
 determine the plurality of mesh devices in the mesh network that correspond to the plurality of switch identifiers.

* * * * *